United States Patent

Wilson

[15] 3,675,333

[45] July 11, 1972

[54] LINEAR THREE-DIMENSIONAL GAGING AND FORM MEASURING MACHINE

[72] Inventor: Gardner P. Wilson, Pasadena, Calif.

[73] Assignee: Gould Inc., Chicago, Ill.

[22] Filed: April 8, 1970

[21] Appl. No.: 26,493

[52] U.S. Cl. ....................33/23 C

[51] Int. Cl. ....................B43l 13/10

[58] Field of Search ....................33/18, 23 R, 23 C, 23 M, 32 R, 33/32 A, 32 B

[56] References Cited

UNITED STATES PATENTS 676,326 6/1901 Kutzbach ....................33/23 C 3,328,884 7/1967 Staderini ....................33/23 R 1,878,138 9/1932 Herrmann ....................33/23 C

*Primary Examiner*—Harry N. Haroian

*Attorney*—Eber J. Hyde

[57] ABSTRACT

There is disclosed a device and method for the transposition of a three-dimensional X,Y,Z, axis relief configuration onto a two-dimensional X-Y-axis record surface. A stylus repeatedly scans the device, such as a coin, and a recorder pen repeatedly scans a record sheet in synchronism, each successive scan of the coin and recorder being offset slightly from the previous scan. When the stylus is moved in the Z or vertical direction by the surface of the coin the recorder pen is correspondingly moved in, for example, the Y direction, producing a two-dimensional picture of the coin with a three-dimensional appearance.

7 Claims, 1 Drawing Figure

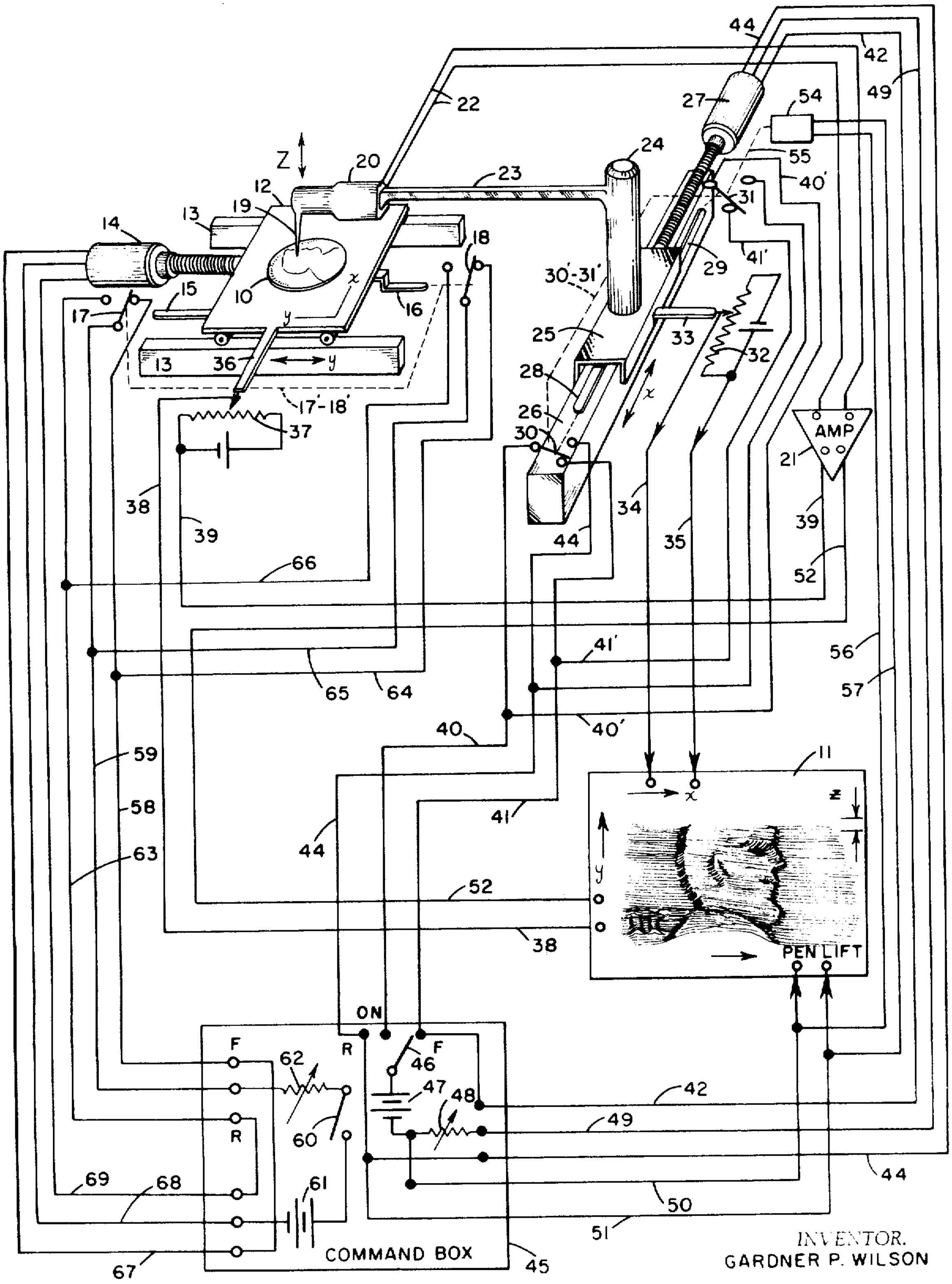
INVENTOR.
GARDNER P. WILSON
BY
[signature]
ATTORNEY

LINEAR THREE-DIMENSIONAL GAGING AND FORM MEASURING MACHINE

BACKGROUND OF THE INVENTION

It is often important for a scientist or an engineer to make a written record of a surface and to greatly enlarge small discontinuances so that they can be studied. In the past there has not been a good system and device to record three-dimensional configurations onto a two-dimensional record sheet with the appearance of a three-dimensional picture. The present system and device converts three-dimensional motion of a stylus into two-dimensional recording on a record sheet resulting in a picture which appears to be three-dimensional.

SUMMARY OF THE INVENTION

The present invention relates to a machine and system which uses a vertically sensitive stylus-transducer device and an amplifier coupled to an accurate X-Y recorder device. A precision reference carriage guides the stylus linearly across the reference specimen to be studied in a series of closely spaced X-axis direction parallel tracks, and a precision carriage may be used to continuously move the specimen slowly in the Y-axis direction during each trace. The X-Y recorder records the traces of the stylus across the reference specimen and the Z-axis motion of the stylus is converted into an additional X- or Y-axis motion of the recording device to draw an apparent three-dimensional picture of the surface of the specimen. Alternatively, the specimen may remain fixed and the stylus partake of both the X-axis motion and the Y-axis motion; also, the stylus may remain fixed and the specimen partake of both the X- and Y-axis motions.

OBJECTS

It is an object of this invention to provide a device and system to scan a three-dimensional object and reproduce its surface on a two-dimensional record with an apparent three-dimensional appearance.

Another object of the invention is to provide a recorder device and system which records a larger number of linear parallel stylus scans of a specimen side-by-side on a record member with a Z-axis motion of the stylus recorded as either an X- or Y-axis modulation of the recorder trace to provide a three-dimensional contour-like map of the surface.

For a better understanding of the present invention, together with other and further objects thereof, reference is had to the following description taken in connection with the accompanying drawings, and its scope will be pointed out in the appended claims.

With reference to the single sheet of drawing there is shown a device and circuit therefor comprising a linear trace, three-dimensional gaging and surface form measuring and recording system.

Referring to the drawing there is shown a specimen 10, such as a coin, for example, whose three-dimensional surface is to be transposed to and recorded on a record chart 11 in apparent three-dimensional configuration.

Specimen 10 is mounted on table 12 supported by accurate ways 13 and adapted to be continuously very slowly moved in the Y direction by motor 14. Limit switch actuating fingers 15 and 16 are connected to the table 12 for actuating limit switches 17 and 18 to reverse motor 14 and return table 12 to its "start" position at the proper time.

A stylus device 20 including stylus 19 is maintained in contact with the surface of the specimen 10 and is of the type sensitive to hill-and-dale movement, i.e., when moved in the vertical or Z-axis direction it produces an electric signal indicative of the amount of the vertical motion. The output from the stylus device 20 is connected into the input of amplifier 21 through leads 22. The stylus device 20 is mounted by arm 23 and pedestal 24 to table 25 which is supported by accurate ways 26 and is adapted to be moved in the X direction by motor 27. Limit switch actuating fingers 28 and 29 are connected to table 25 for actuating limit switches 30,31 to reverse the transverse of table 25 and return it to its "start" position. An X-axis position potentiometer 32 is mounted near table 25 and a potentiometer arm 33 engages the potentiometer so that as the table 25 is moved back and forth in the X-axis direction to cause repetitive scans of the specimen 10, the X-axis position is continuously transmitted by leads 34, 35 to the X-axis position input of the X-Y recorder device 11.

Similarly, as table 12 is moved in the Y-axis direction, a potentiometer arm 36 in engagement with potentiometer 37 indicates the Y-axis position of the table 12 by means of lead 38 and lead 39, amplifier 21 and lead 52 connected to the X-Y recorder 11.

Limit switches 17 and 18 have a mechanical interconnection indicated by the dotted line 17–18 and limit switches 30, 31 have a mechanical interconnection indicated by the dotted line 30–31 so that the switches are thrown in pairs for forward and reverse operation. Command box 45 controls the operation of the device, together with potentiometers 32, 37 and the several limit switches 17,18 and 30,31.

In operation, when command box switch 46 is thrown to the "on" position, battery 47 is connected through variable resistor speed control 48 and through lead 49 to motor 27 to cause X-axis motion of table 25 and stylus device 20 between the forward and reverse limits set by switches 30,31, and causing potentiometer arm 33 to scan the potentiometer 32, thereby through leads 34,35 to continuously inform the X-Y recorder of the X-axis position of the stylus device 20 on the specimen 10. During the reverse motion of table 25, as controlled by the limit switches 30,31, the "pen lift" circuit of the X-Y recorder 11 is energized from the command box 45 through leads 50,51 to cause the recording pen of the X-Y recorder not to make a reverse trace on the record chart. If there were no backlash in the system, return recording could be done, but since it is difficult to eliminate all backlash it is preferable for very accurate work to record only in one direction. During the forward motion of stylus device 20 across specimen 10 the "pen lift" is not in operation and a trace is made by the recorder pen (not shown) on the record member in the X-Y recorder. With switch 60 in command box 45 closed, during each X-trace the table 12 undergoes very slow, continuous, Y-axis motion, subsequently described in detail.

Vertical or Z-axis motion of the stylus 19 of device 20 produces an electric signal which is fed to amplifier 21 through lead 22, and out of amplifier 21 through leads 52,39, through the Y position potentiometer 37 and through lead 38 to the Y-axis control of the pen of X-Y recorder 11, to cause a Y-axis modulation of the pen in accordance with the magnitude of the Z-axis motion of the stylus on the specimen 10. This Y-axis modulation is in addition to the continuous, very slow, Y-axis motion of table 12, continuous position information in regard thereto being under the control of potentiometer 37.

Energization of motor 14 is from command box 45 when switch 60 is closed to "on" position and limit switches 17 and 18 are in the positions shown. Speed control resistor 62 is in the circuit including leads 59,58, and 67,68, and battery 61 drives motor 14. When table 12 reaches its limit of travel, limit switch arm 15 actuates switch 17 and through interconnection 17′–18′ also throws switch 18 into "reverse" position. The circuit to motor 14 is then from battery 61, speed control 62, lead 59, switch 17 (in thrown position), lead 63, lead 69 to motor 14 and back to the command box 45 through lead 68.

For "forward" operation, with switch 46 of command box 45 closed to its "on" position, battery 47 is connected through lead switch 30 and lead 41 in the "forward" circuit, and through lead 42 to drive motor 27. The return circuit from motor 27 is through lead 49 and speed control variable resistor 48 to battery 47.

Limit switch 31 is in the aforedescribed circuit by means of leads 40′ and 41′.

For reverse operation, limit switches 30,31 are thrown to their alternate poles "R," by limit switch finger 39 and the mechanical interlink 30'–31'. The reverse energization circuit for motor 27 is from battery 47, speed control variable resistor 48, lead 49, lead 44 to switch 30 and back to command box 45 through lead 40 to switch 46.

In the previous description the specimen 10 is secured to table 12 by any suitable means, and table 12 is moved in the Y-axis direction at a slow, continuous rate of speed which is about one one-hundredth or less of X scan speed. This means that each X scan trace on the X-Y recorder 11 has a very slight slope to it depending upon the relative X and Y scan speeds. Each successive trace, however, is essentially parallel to the previous trace, except for the slight differences in Y-axis modulation due to the vertical or Z-axis motion of stylus 21.

An alternative method is to move table 12 an incremental step in the Y-axis direction between X-axis scans, and to maintain the table 12 stationary during each X-axis scan. This can be accomplished by having a stepper-type motor 14 which is energized when X-axis limit switch 31 is thrown by limit switch arm 29, thereby to step the table 12 to a new, closely-spaced, position while table 25 is returning for the next X-axis scan.

In order to scan specimens 10 of different size the limit arms 15,16 of the Y-axis dimension, and limit arms 28,29 of the X-axis dimension should be adjustable in length, or the positions of the limit switches can be adjustable.

Two other alternative arrangements are as follows: (1) The specimen 10 may be maintained stationary and the stylus device 20 movable in both the X- and Y-axis directions across it, and (2) the stylus device 20 may be maintained stationary and the specimen 10 movable in both the X- and Y-axis directions.

Means may be provided to omit every nth scan to make it easier for the operator to follow a particular profile, akin to the technique used in contour mapping wherein every *n*th contour line is printed as a heavier line. In order to achieve this a stepping switch counter device 54, including a battery, is mechanically linked to limit switch 31 by means of mechanical connection 55, and its electric output is connected into leads 50,51 of the pen lift mechanism of X-Y recorder 11 through leads 56,57, thereby to prevent the pen of the X-Y recorder 11 from writing every *n*th trace. Alternatively a dashed line could be written at every *n*th line.

Any desired amplification of X, Y, or Z signal may be achieved. The X and Y axes may be interchanged and polarities of the record signal may be reversed. Different X and Y sensitivities can create an isometric view of the specimen whose surface is recorded. Thus, a very flexible, (three-dimensional) 3-D record of the surface of a specimen is obtainable.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. An apparatus for the transposition of a three-dimensional X, Y, Z, axis relief configuration onto a two-dimensional X-, Y-axis record surface, comprising in combination;

means for repeatedly linearly scanning said configuration in one of the X-, Y-axis directions utilizing pick-up stylus means sensitive to motion in the Z-axis direction to produce an electrical output related to said Z-axis motion, means for repeatedly linearly scanning said record surface in the same one of the X-, Y-axis directions with an electrically actuated recording device for recording on said record surface, electrical connection means connecting the configuration scanning means to the linear record surface scanning means to synchronize their linear scans, means electrically connecting the pick-up stylus means to said recording device to cause said recording device to move across said record member in the other of said X-, Y-axis directions in accordance with the magnitude of the electrical output from said pick-up stylus means, first increment means for imparting between scans relative motion in the other of said X-, Y-axis directions between said pick-up stylus means and said configuration, and second increment means for imparting between scans relative motion in the other of said X-, Y-axis directions between said recording device and said record surface.

2. Apparatus as set forth in claim 1, further characterized by:

means operative at every *n*th scan of said record surface to cause said recording device to alter its trace from its normal trace.

3. Apparatus as set forth in claim 2, further characterized by said means operative at every *n*th scan being operative to prevent the recording device from recording a trace on the record member during the *n*th scan.

4. Apparatus for the transposition of a three-dimensional X,Y,Z, axis relief configuration onto a two-dimensional X,Y axis record surface, comprising, in combination:

means for repeatedly linearly scanning said configuration in the X axis direction utilizing pickup stylus means sensitive to motion in the Z axis direction to produce an electrical output related to said Z axis motion, an electrically actuated X-Y recorder device including a recording member and said record surface and including means for repeatedly linearly scanning said recording member across said record surface in the X axis direction for recording on said record surface, connection means connecting the configuration scanning means to the X-Y recorder device to synchronize their linear scans, means electrically connecting the pickup stylus means to the X-Y recorder device to cause said recording member to move across said record member in the Y axis direction in accordance with the Z axis magnitude of the electrical output from said pickup stylus means, and means for imparting relative motion in the Y axis direction between said pickup stylus means and said configuration and between said recording member and said record surface.

5. A method for the transposition of a three-dimensional X, Y, Z, axis relief configuration onto a two-dimensional X-, Y-axis record surface, comprising:

repeatedly linearly scanning said configuration in one of the X-, Y-axis directions utilizing pick-up stylus means sensitive to motion in the Z-axis direction to produce an electrical output related to said Z-axis motion, successive scans being offset from each other by a small amount in the other of said X-, Y-axis directions;

simultaneously repeatedly linearly scanning said record surface in one of the X-, Y-axis directions with an electrically actuated recording device recording on said record surface, successive scans being offset from each other by a small amount in the other of said X-, Y-axis directions;

synchronizing the scanning of said configuration and said record surfaces;

the said electrical output actuating said recording device in the other of the X-, Y-axis directions as said recording device records on said record member, thereby modulating the said successive scans of said recording device in accordance with the Z-axis motion of said pick-up stylus.

6. A method as set forth in claim 5, further characterized by:

maintaining said configuration stationary in said one of the X-, Y-axis directions while moving said stylus means across it in said direction, and by continuously moving said configuration in the other of said X-, Y-axis directions at a rate slow compared to the rate of motion of said stylus means across said configuration.

7. A method as set forth in claim 5, further characterized by:

maintaining said configuration stationary in said one of the X-, Y-axis directions while moving said stylus means across it in said direction, and by intermittently moving said configuration in the other of said X-, Y-axis directions by a small amount between scans of said stylus means across said configuration.

* * * * *